United States Patent [19]

Jassby et al.

[11] Patent Number: 5,323,962
[45] Date of Patent: Jun. 28, 1994

[54] FLEXIBLE GUIDE SYSTEM

[75] Inventors: Kenneth Jassby, Herzlia; Amir Ziv-Av, Givat-Shmuel; Binyamin Naor, Givataim, all of Israel

[73] Assignee: IRT Inspection Research and Technologies Ltd., Israel

[21] Appl. No.: 25,176

[22] Filed: Mar. 2, 1993

[30] Foreign Application Priority Data

Mar. 31, 1992 [IL] Israel ................................ 101428

[51] Int. Cl.$^5$ ............................................. B23K 37/02
[52] U.S. Cl. .................................. 238/10 R; 105/29.1
[58] Field of Search ................. 105/29.1, 29.2, 30; 238/10 R, 10 A; 104/118, 306, 307; 219/60 A; 228/29; 266/56

[56] References Cited

U.S. PATENT DOCUMENTS

| | | | |
|---|---|---|---|
| 2,104,510 | 1/1938 | Einfalt | 105/29.2 |
| 3,575,364 | 4/1968 | Frederick | 106/29.1 |
| 4,515,374 | 5/1985 | Herren | 105/30 |
| 4,570,542 | 2/1986 | Cable et al. | 238/10 R |
| 5,070,792 | 12/1991 | Harris | 105/29.1 |

*Primary Examiner*—Mark T. Le
*Attorney, Agent, or Firm*—Anthony J. Casella; Gerald E. Hespos

[57] ABSTRACT

A flexible guide-track system, including a guide track constituted by a leaf spring formed of a plurality of stacked, elastically resilient leaves joined to one another along their longitudinal extent and slidable relative to one another for some distance at other points of the extent. Due to the slidability, the leaf spring is elastically deformable to conform to a non-planar surface. The system further includes a plurality of attachments to fixedly attach the leaf spring to the surface after having been elastically deformed, to make it conform to the non-planar surface, a plurality of clamps to maintain the leaf spring in the elastically deformed state, a plurality of spacers mounted on the leaf spring for maintaining the leaf spring, when so deformed, at a predetermined, substantially uniform distance from the non-planar surface, and a carriage riding on, and guided by, the flexible guide track. The carriage is provided with at least three pairs of rollers straddling and gripping the track at the longitudinal edges thereof.

9 Claims, 4 Drawing Sheets

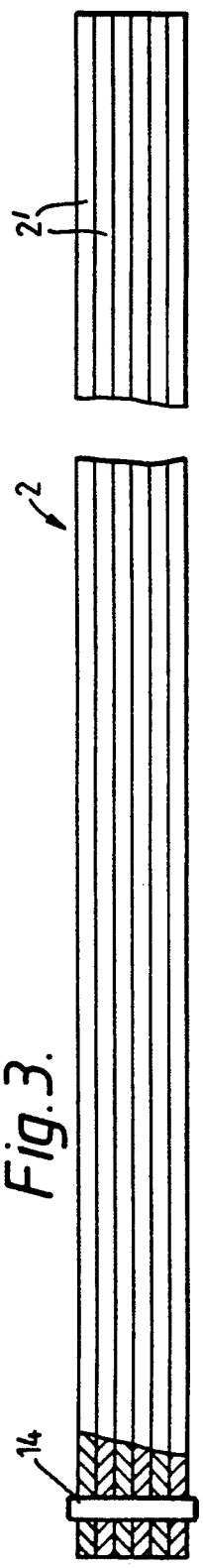
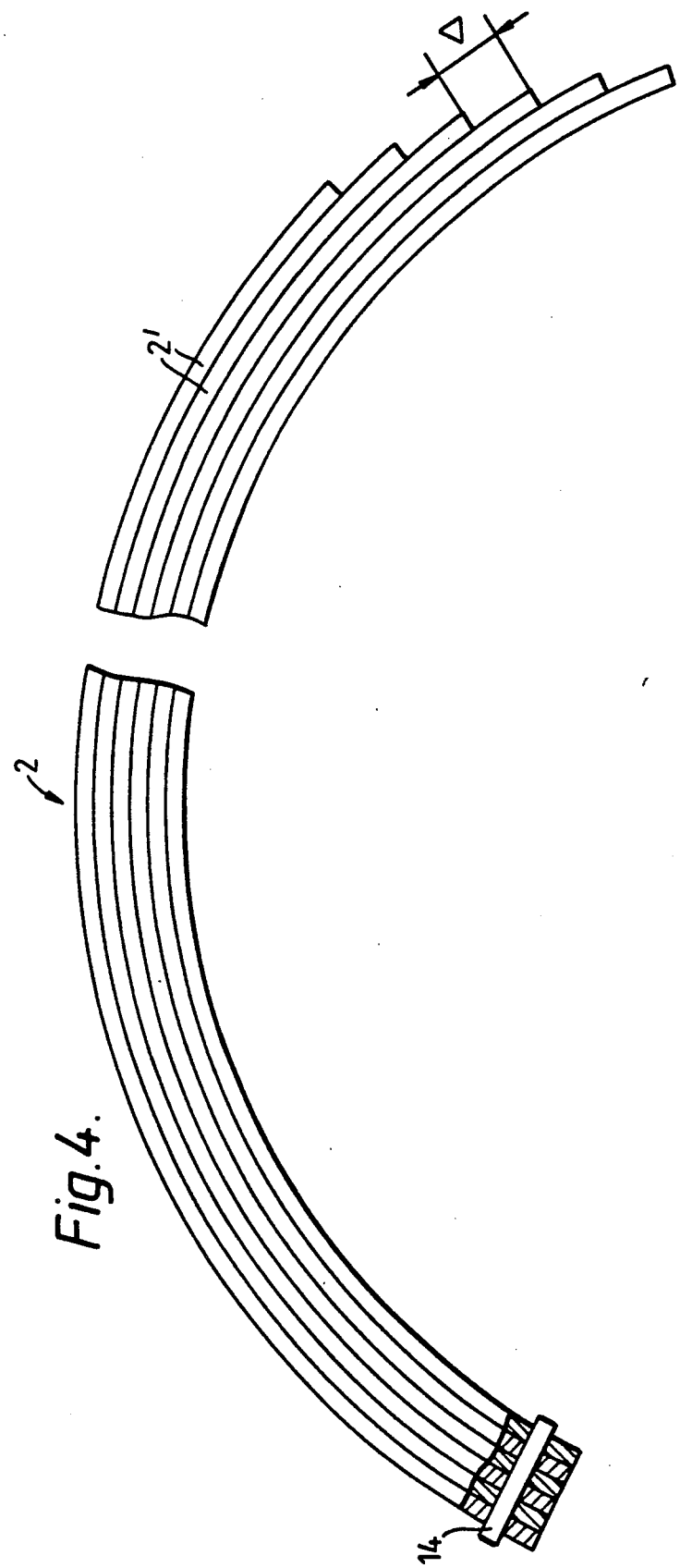
Fig.3.
Fig.4.

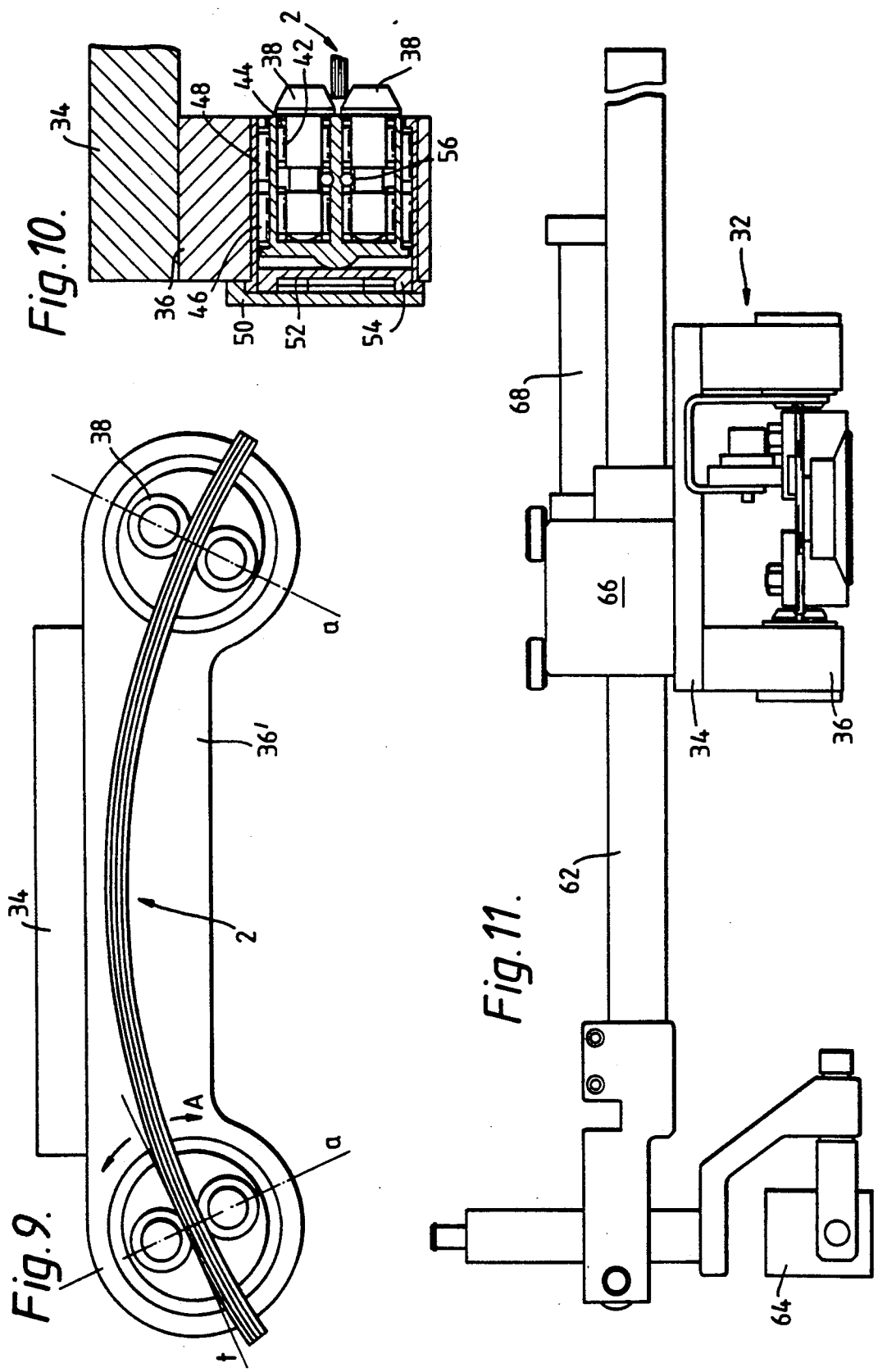

FLEXIBLE GUIDE SYSTEM

The present invention relates to an elastically flexible guide system for the accurate positioning, and monitoring of the motion, of robotic and other carriage-mounted manipulative or sensing devices, along curved surfaces, both convex and concave, or a combination thereof.

Systems of this kind are today used in material testing by ultrasonic imaging or eddy-current scanning, for precision lay-out and marking of objects with non-planar or second-order surfaces, etc.

Systems for such purposes are known, at least as far as convex surfaces are concerned. Their use, however, is time-consuming and cumbersome, as their steady and stable mounting on the surface of interest is complicated, involving as it does the use of belting, ropes, brackets, etc. Also because of the above mounting methods, they are not suitable for use with concave surfaces or surfaces with compound curvatures such as, e.g. saddle surfaces, or undulating surfaces.

It is one of the objects of the present invention to provide a flexible guide system that is easily and rapidly mounted on curved surfaces, whether convex, concave or a combination thereof, and that includes a platform, or carriage moveable along the flexible guide, for the mounting thereon of the above-mentioned manipulative or sensing devices.

According to the invention, this is achieved by providing a flexible guide-track system, comprising: a guide track constituted by a leaf spring formed of a plurality of stacked, elastically resilient leaves joined to one another at at least one point along their longitudinal extent and slidable relative to one another for at least some distance at other points of said extent, due to which slidability said leaf spring is elastically deformable to conform to a non-planar surface; a plurality of attachment means to fixedly attach said leaf spring to said surface after having been elastically deformed to make it conform to said non-planar surface; a plurality of clamping means to maintain said leaf spring in said elastically deformed state; a plurality of spacer means mounted on said leaf spring for maintaining said leaf spring, when so deformed, at a predetermined, substantially uniform distance from said non-planar surface, and carriage means riding on, and being guided by, said flexible guide-track, and being provided with at least three pairs of rollers straddling and gripping said track at the longitudinal edges thereof.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 3 is an elevational view, in partial cross section, of the guide track in the unflexed state;

FIG. 4 is a similar view, showing the guide track in the bent state;

FIG. 9 shows a sidewall of the carriage with two swivel-mounted roller pairs;

FIG. 10 is a cross-sectional view of the mounting of a roller pair, and

FIG. 11 represents the flexible guide system according to the invention as used in an ultrasonic XY-scanner.

Figure 1:
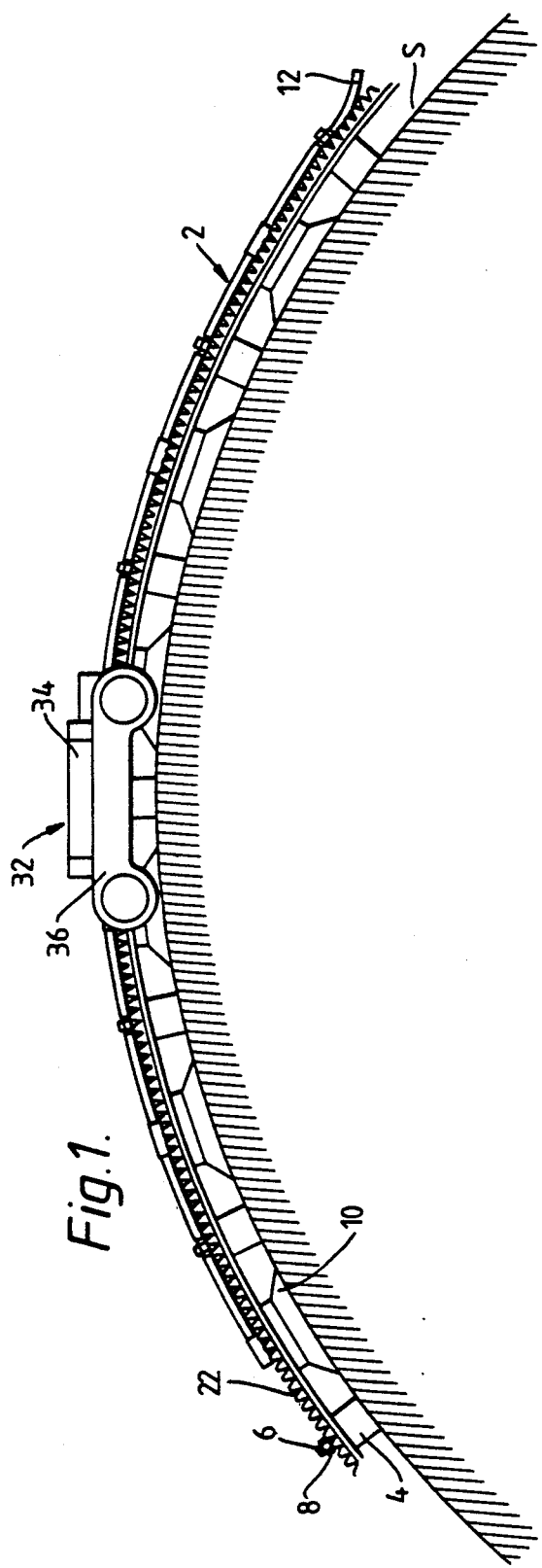
FIG. 1 is an elevational view of the guide system according to the invention as mounted on an object having a convex surface.
Figure 2:
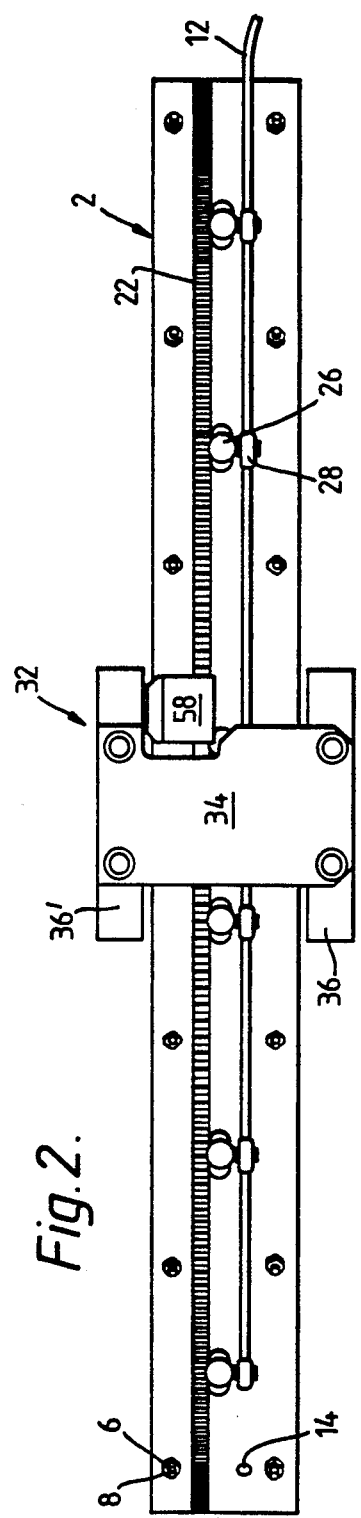
FIG. 2 is a top view of the system in the unflexed state.

Referring now to the drawings, there is seen in FIGS. 1 and 2 a guide track 2 constituted by a leaf spring formed of a plurality of elastically resilient leaves shown in detail further below. The guide track 2 of FIG. 1 is flexed and seen to conform to the curvature of the surface S of the object the guide system is mounted on, keeping a predetermined, uniform distance from this surface with the aid of spacers 4 in the form of prismatic blocks extending across the leaf spring 2 and clampable to the guide track by means of bolts 6 and nuts 8. The significance of this clamping action, which of course affects also the separate leaves will become apparent further below.

Further seen is a plurality of vacuum cups 10, connected via a common vacuum line 12 to a pump (not shown). It is these vacuum cups 10 that, once the guide track 2 has been flexed until the spacers 4 contact the surface S and the leaves of the guide track 2 have been clamped together as described below, press the system against the surface S, thus rendering the guide track for all practical purposes immobile relative to the surface S.

FIG. 3 shows the guide track 2 in the unflexed state. The leaves 2', advantageously made of hardened spring steel of a thickness of, according to length and minimum radii of curvature achievable, between 0.3 and 1.00 mm. The leaves 2' are stacked upon one another and pinned together at one end of the stack by means of pins 14. Apart from this quasi-monolithic end of the guide track 2, for the rest of the longitudinal extent of the guide track 2, the leaves 2' are free to slip or slide relative to one another.

FIG. 4 shows the guide track 2 in the bent state. Clearly seen is the relative slippage between the separate leaves 2' which obviously increases with decreasing radius of curvature of the leaves 2' and decreases with the increase of this radius, i.e., with the return of the guide-track 2 to its original, unflexed state. Clearly, if the leaves 2' of the bent guide track 2 were to be clamped together, thus eliminating the freedom of slippage, the guide track would not be able to return to the unflexed state of FIG. 3, and the curvature imparted to it would be maintained. This exactly is what happens when, after the guide track 2 has been bent to conform to the surface S, the nuts 8 are tightened, clamping the leaf spring 2 between themselves and the spacers 4.

From the above it is clear that the leaves 2' must be provided with a series of apertures, first of all, for the pins 14, and for the clamping bolts 6.

Figure 5:
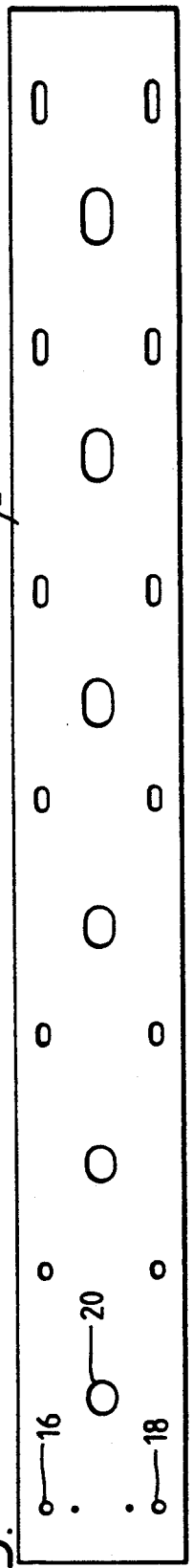
FIG. 5 is a top view of the stacked, unflexed leaves.

A top view of the stacked, unflexed guide track leaves 2' is provided in FIG. 5. There are seen two holes 16 for the pins 14 (FIGS. 3,4) and two rows of apertures 18 for the clamping bolts 6. While the aperture 18 at the pegging end of the stacked leaves 2' is a simple round hole, the rest of the apertures 18 are seen to become more and more elongated towards the free end of the leaves 2', clearly to accommodate the relative slippage between the guide-track leaves 2' when flexed and to allow the bolts, 6 to freely pass also with maximum spring curvatures.

Another row of apertures, 20, is seen along the longitudinal axis of the leaves 2'. These apertures 20 are required for the metal hub 26 (see FIG. 6) of the vacuum cup 10 to pass through the guide-track leaves 2' and in analogy to the apertures 18, and for the same reason, they, too, become more and more elongated towards the free end of the leaves 2'.

On the uppermost leaf of the guide track 2 there is mounted a gear rack 22 which as will be shown further below, is instrumental in causing the translational movement of a carriage riding on the guide track 2 to drive a rotary encoder as a function of the distance travelled by that carriage. The rack 22 is fixedly attached to the top leaf 2' at the pegging and thereof and clampable to the top leaf 2' by means of clamping rails (not shown) actuated when the clamping nuts 8 are tightened.

Figure 6:
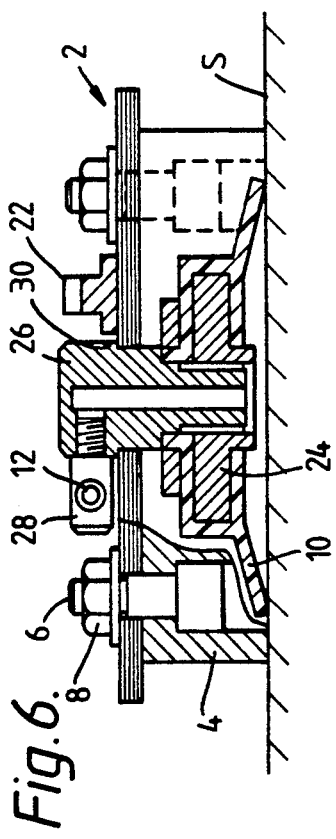
FIG. 6 is a cross-sectional view of the vacuum cup as activated.

FIG. 6 shows the vacuum cup 10 as attached to the guide track 2. In the cup 10, made of an elastomer, there is embedded a metallic, disk-like nut 24 by means of which the cup 12 is mounted on a metallic hub 26 with a central bore communicating with a laterally attached connector 28 to which is attached the vacuum line 12. FIG. 6 represents the cup 10 as evacuated and pulling down the hub 26, a shoulder 30 of which abuts against the guide track 2 and pushes the spacer 4 against the object surface S.

It would of course be possible to use rubber-rimmed metal bellows instead of elastomer vacuum cups.

Figure 7:
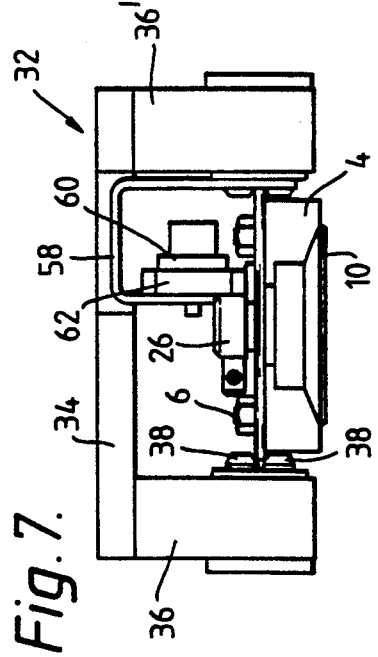
FIG. 7 is a sideview of the carriage riding on the guide track.

The carriage 32, designed to carry a robotic or otherwise manipulative or sensing and monitoring device along the guide track 2 in a precisely controllable and repeatable manner is shown in FIG. 1 in elevation, in FIG. 2 in top view and in FIG. 7 in side view. It consists of a platform 34 on which the devices are to be mounted and of two sidewalls 36, 36' which accommodate tracking rollers, to be explained in detail further below, which ensure smooth motion along the guide track 2, while preventing lateral play.

Figure 8:
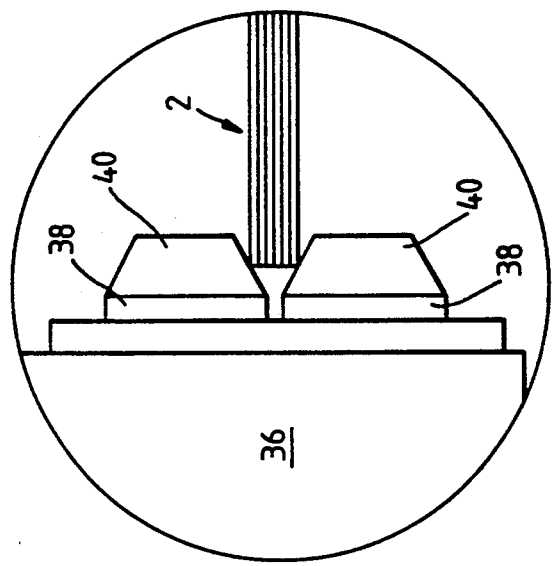
FIG. 8 is an enlarged view of one pair of rollers seen to grip the edges of the guide track.

There are eight tracking rollers 38 arranged in pairs, each sidewall 36, 36' accommodating two pairs of rollers 38, each pair having heads with tapering faces 40 between which the edges of the guide track 2 are gripped, as clearly seen in FIG. 8. The opposite edges of the guide track 2 are obviously gripped by rollers 38 accommodated in the opposite sidewall 36', as seen in FIG. 7.

If the guide track 2 were plane, such an arrangement would suffice. However, by the very definition of the invention, the guide track 2 may assume various curvatures, along which the carriage 32 must be able to travel smoothly and without play. This requires each pair of rollers 38 to be swivel-mounted (arrows A in FIG. 9), so that, as seen in FIG. 9, the lines a connecting the respective centers of the rollers 38 of each pair will always point towards the instantaneous centers of curvature of the guide track 2, or in other words, will always be normal to the tangent t at the point of contact of each roller 38 with the edge of the guide track.

A practical solution to this problem is represented in FIG. 10 which shows a pair of rollers 38 mounted on needle bearings 42 in an inner bearing body 44 which, in its turn, is mounted on needle bearings 46 in an outer bearing sleeve 8, retained in its bore in the carriage sidewall 36 by a cover plate 50.

Further seen are spring washers 52 which, via a pressure plate 54, apply axial pressure via the inner bearing body 44 to the pair of rollers 38, which pressure is taken up by the opposite roller pair in sidewall 36' (not shown), eliminating any lateral play and ensuring low-friction, smooth and non-sticky movement of the carriage 32 along the guide track.

The rollers 38 and bearing bodies 44 are retained in the sidewalls 36, 36' by pins 56 located between the cages of needles 42.

The above-mentioned opposite pair of rollers 38 may, but need not, have a similar axial pressure arrangement.

Further seen in FIG. 7 is a bracket 58 attached to the end of the inner bearing body 44 and thus swivelling together with the latter. The bracket 58 carries a rotary encoder 60 and a gear wheel 62, mounted on the encoder shaft, engaging the rack 22. Thus, when the carriage 32 is moved along the track 2, the encoder is rotated and thus records and displays the instantaneous position of the carriage 32. Proper meshing of gear wheel 62 and rack 22 at all curvatures of the guide track 2 is ensured due to the above-mentioned swiveling of the bracket 58 together with the imaginary line a in FIG. 9.

Taking into account the very small torque required for rotation of the encoder 60, a friction drive could be used to translate the carriage movement along the guide track 2 into a rotary motion of the encoder shaft.

The carriage 2 is moved and positioned manually or by means of a source of rotary power such as an electric motor, the output pinion of which could engage the rack 22.

FIG. 11 illustrates the use of the flexible guide-track according to the invention for a manually operated ultrasonic XY scanner. Here, the guide track 2 and the carriage 32 provide the X-motion, while the Y-motion is produced by a bar 62 which carries the transducer 64. The guiding and feeding mechanism 66 of the bar 62 is mounted on the platform 34 of the carriage 32. Seen is also a handle 68 whereby the carriage 32 is moved along the guide track 2.

While the vacuum-cup method of attachment can be used with all materials, plastic, ferrous and non-ferrous, it would be possible to utilize magnetic pads for use with ferromagnetic materials.

The point at which the stacked leaves 2' are pinned together could also be positioned at locations other than their end, for instance at the midpoint of their longitudinal extent. In this case the above mentioned gradual elongation of the apertures 18 and 20 would be from that mid-point towards the end on both sides.

While the rotary encoder is a convenient means monitoring the position of the carriage 32 along the guide track 2, other arrangements may also be used, for instance signal-producing markings on the track in combination with an optical reader mounted on the carriage 32.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A flexible guide-track system, comprising:
   a guide track constituted by a leaf spring formed of a plurality of stacked, elastically resilient leaves joined to one another at at least one point along their longitudinal extent and slidable relative to one another for at least some distance at other points of said extent, due to which slidability said leaf spring is elastically deformable to conform to a non-planar surface;
   a plurality of attachment means to fixedly attach said leaf spring to said surface after having been elastically deformed to make it conform to said non-planar surface;
   a plurality of clamping means to maintain said leaf spring in said elastically deformed state;
   a plurality of spacer means mounted on said leaf spring for maintaining said leaf spring, when so deformed, at a predetermined, substantially uniform distance from said non-planar surface, and
   carriage means riding on, and being guided by, said flexible guide track, and being provided with at least three pairs of rollers straddling and gripping said track at the longitudinal edges thereof.

2. The system as claimed in claim 1, wherein said attachment means are vacuum cups provided with rigid hubs whereby said cups are connectable to a vacuum line and whereby said flexible guide track is held down against said surface when said cups are evacuated.

3. The system as claimed in claim 1, wherein said spacer means is in the form of a block extending across said guide track.

4. The system as claimed in claim 1, wherein said clamping means is bolts and nuts adapted to press against one another said stacked leaves and said spacer means, thereby preventing said leaves from sliding relative to one another.

5. The system as claimed in claim 1, wherein said carriage means comprises a platform and two sidewalls and wherein there are provided four pairs of rollers, two pairs accommodated in each sidewall.

6. The system as claimed in claim 5, wherein each roller of each roller pair is mounted to be independently rotatable about its axis in a bearing body common to each pair, which bearing body is in turn rotatably mounted in a bearing sleeve fixedly attached to a sidewall.

7. The system as claimed in claim 5, wherein at least one roller pair of one of said sidewalls is axially biased by elastic biasing means in direction towards its opposite roller pair of the other one of said sidewalls.

8. The system as claimed in claim 1, further comprising a gear rack attached to the uppermost of said elastically resilient leaves and extending along the active length thereof.

9. The system as claimed in claim 1, further comprising a rotary encoder mounted on said carriage means and including a gear wheel fixedly attached to an input shaft of said rotary encoder, said encoder being mounted in such a position that said gear wheel is in uninterrupted operative mesh with said rack on said flexible guide track regardless of the position of said carriage along said flexible guide track or the curvature thereof.

* * * * *